United States Patent
Yin

(10) Patent No.: US 10,210,161 B2
(45) Date of Patent: Feb. 19, 2019

(54) METHOD AND DEVICE FOR INQUIRING MAP

(71) Applicant: BAIDU ONLINE NETWORK TECHNOLOGY (BEIJING) CO., LTD., Beijing (CN)

(72) Inventor: Lei Yin, Beijing (CN)

(73) Assignee: BAIDU ONLINE NETWORK TECHNOLOGY (BEIJING) CO., LTD., Beijing (CN)

( * ) Notice: Subject to any disclaimer, the term of this patent is extended or adjusted under 35 U.S.C. 154(b) by 297 days.

(21) Appl. No.: 15/115,932

(22) PCT Filed: Jan. 16, 2015

(86) PCT No.: PCT/CN2015/070889
§ 371 (c)(1),
(2) Date: Aug. 2, 2016

(87) PCT Pub. No.: WO2015/172578
PCT Pub. Date: Nov. 19, 2015

(65) Prior Publication Data
US 2017/0169036 A1    Jun. 15, 2017

(30) Foreign Application Priority Data
May 13, 2014 (CN) .......................... 2014 1 0201258

(51) Int. Cl.
*G06F 17/30* (2006.01)
*G01C 21/10* (2006.01)
(Continued)

(52) U.S. Cl.
CPC ....... *G06F 17/30061* (2013.01); *G01C 21/10* (2013.01); *G01C 21/20* (2013.01);
(Continued)

(58) Field of Classification Search
CPC ............... G06F 17/30061; G06F 17/30; G06F 17/3087; G01C 21/10; G01C 21/20; G01C 21/3679
(Continued)

(56) References Cited

U.S. PATENT DOCUMENTS 6,122,593 A * 9/2000 Friederich .............. G01C 21/32
701/23
6,249,740 B1 * 6/2001 Ito .......................... G01C 21/34
340/910
(Continued)

FOREIGN PATENT DOCUMENTS

| CN | 102163214 | 8/2011 |
| CN | 102385636 | 3/2012 |

(Continued)

OTHER PUBLICATIONS

International Searching Authority, International Search Report for PCT/CN2015/070889 dated Apr. 29, 2015.

*Primary Examiner* — Thanh-Ha Dang
(74) *Attorney, Agent, or Firm* — Hodgson Russ LLP

(57) ABSTRACT

A method and a device for inquiring a map are provided. The method includes receiving a query statement inputted by a user; performing a word segmentation on the query statement received to obtain a result of the word segmentation; extracting specific information related to a demand of the user from the result of the word segmentation; inquiring a route and/or a point of interest related to the specific information extracted in a map.

11 Claims, 1 Drawing Sheet

(51) Int. Cl.
*G01C 21/20* (2006.01)
*G01C 21/36* (2006.01)

(52) U.S. Cl.
CPC ......... *G01C 21/3679* (2013.01); *G06F 17/30* (2013.01); *G06F 17/3087* (2013.01)

(58) Field of Classification Search
USPC .......................................................... 707/724
See application file for complete search history.

(56) References Cited

U.S. PATENT DOCUMENTS

| | | | | |
|---|---|---|---|---|
| 6,334,087 | B1* | 12/2001 | Nakano | G01C 21/3632 |
| | | | | 701/410 |
| 6,636,802 | B1* | 10/2003 | Nakano | G01C 21/32 |
| | | | | 701/532 |
| 7,325,010 | B1 | 1/2008 | Kim | |
| 9,322,664 | B2* | 4/2016 | Nishibashi | G01C 21/3658 |
| 2005/0096840 | A1* | 5/2005 | Simske | G01C 21/3492 |
| | | | | 701/533 |
| 2005/0131645 | A1* | 6/2005 | Panopoulos | B60P 1/5457 |
| | | | | 701/472 |
| 2005/0140524 | A1* | 6/2005 | Kato | G08G 1/096811 |
| | | | | 340/995.13 |
| 2005/0234970 | A1* | 10/2005 | Utsui | G01C 21/3611 |
| 2007/0021905 | A1* | 1/2007 | Takashima | G01C 21/3461 |
| | | | | 701/533 |
| 2009/0204582 | A1 | 8/2009 | Grandhi et al. | |
| 2011/0093188 | A1* | 4/2011 | Barkai | G01C 21/20 |
| | | | | 701/532 |
| 2012/0016577 | A1 | 1/2012 | Kim et al. | |
| 2013/0204528 | A1* | 8/2013 | Okude | G08G 1/096822 |
| | | | | 701/533 |

FOREIGN PATENT DOCUMENTS

| | | |
|---|---|---|
| CN | 103644906 | 3/2014 |
| JP | 2003214858 | 7/2003 |
| JP | 2004334228 | 11/2004 |
| JP | 2009075652 | 4/2009 |
| JP | 2010236858 | 10/2010 |
| JP | 2012008940 | 1/2012 |
| JP | 2012104004 | 5/2012 |
| JP | 2012242174 | 12/2012 |
| JP | 2013217683 | 10/2013 |
| JP | 2014016808 | 1/2014 |
| KR | 20000023961 | 5/2000 |
| KR | 20120007220 | 1/2012 |

* cited by examiner

METHOD AND DEVICE FOR INQUIRING MAP

CROSS-REFERENCE TO RELATED APPLICATION

This application is a national phase entry under 35USC § 371 of International Application PCT/CN2015/070889, filed Jan. 16 2015, which claims priority to Chinese Patent Application Serial. No. 201410201258.8, titled "A Method and an Apparatus for Inquiring a Map" filed with the State Intellectual Property Office of P. R. China on May 13, 2014, the entire contents of which are incorporated herein by reference.

FIELD

The present disclosure relates to a method and an apparatus for inquiring a map, a device and a computer storage medium, more particularly to a technique of map inquiring according to a demand of a user contained in a query statement.

BACKGROUND

Currently, there are a variety of electronic map service systems on the market, which may not only provide users with the search for a variety of points of interest via the Internet, but may also provide routes, road condition inquiries and other navigation functions. However, these map service systems require the user to input explicit location information in order to provide the feedback results related thereto. If the location information inputted by the user is inexplicit or the information inputted is overgeneralized, the feedback result is frequently empty, and sometimes even if the user changes the search content inputted for several times, one cannot get the results in accordance with his/her demand. For instance, when the user inputs "will date with my girlfriend at Shangdi Hualian at 7 pm tonight" in a map search, although such inputted information contains several user's demands, it does not give an explicit search location, and thus there is not any electronic map system that can get feedback results.

In terms of this problem, there is an urgent need to provide a method and an apparatus for inquiring a map according to a user's demand contained in a query statement so as to solve it.

SUMMARY

Embodiments of the present disclosure aim to provide a method and an apparatus for inquiring a map, a device and a computer storage medium, which may not only perform a map inquiry according to a user's demand contained in a query statement, but also enable a result of the map inquiry to be closer to the user's demand.

According to an aspect of the present disclosure, a method for inquiring a map is provided. The method includes: receiving a query statement inputted by a user; performing a word segmentation on the query statement received to obtain a result of the word segmentation; extracting specific information related to a demand of the user from the result of the word segmentation; inquiring a route and/or a point of interest related to the specific information extracted in a map.

Preferably, inquiring a route related to the specific information extracted in a map, includes: determining a site as a terminal point of a route planning, if there is information about the site in the specific information extracted; positioning a geographical position where the user is located to obtain a positioning result, and determining the positioning result as an origin of the route planning; inquiring the route related to the specific information extracted in the map according to the origin and the terminal point determined.

Preferably, the method further includes: acquiring road condition information of the route inquired at a time, if there is also information about the time in the specific information extracted.

Preferably, the method further includes: calculating a travel time of the user in accordance with the route inquired, according to the route inquired and the road condition information acquired.

Preferably, calculating a travel time of the user in accordance with the route inquired, specifically includes:

if a self-driving is employed, calculating the travel time of the user in accordance with the route inquired by a following formula:

$$T_v = \sum_{i=1}^{n} S_i \frac{(1 + \exp(-X_i))V_v}{\text{Rate}_v}$$

where $T_v$ represents a travel time of the user in accordance with a self-driving route inquired;

$S_i$ represents a travel distance of an $i^{th}$ road section on the self-driving route inquired;

$X_i$ represents a road condition congestion value of the $i^{th}$ road section on the self-driving route inquired;

$V_v$ represents a predetermined speed of a self-driving vehicle;

$\text{Rate}_v$ represents a congestion influence rate of the self-driving on the travel time;

and/or if a public transport is employed, calculating the travel time of the user in accordance with the route inquired by a following formula:

$$T_P = \sum_{i=1}^{n} S_i \frac{(1 + \exp(-X_i))V_p}{\text{Rate}_p}$$

where $T_p$ represents a travel time of the user in accordance with a public transport route inquired;

$S_i$ represents a travel distance of an $i^{th}$ road section on the public transport route inquired;

$X_i$ represents a road condition congestion value of the $i^{th}$ road section on the public transport route inquired;

$V_p$ represents a predetermined speed of public transport;

$\text{Rate}_p$ represents a congestion influence rate of the public transport on the travel time;

and/or if a walking is employed, calculating the travel time of the user in accordance with the route inquired by a following formula:

$$T_w = \frac{S}{V_w}$$

where $T_w$ represents a travel time of the user in accordance with a walking route inquired; S represents a travel distance of the walking route inquired; $V_w$ represents a predetermined speed of walking.

Preferably, inquiring a point of interest related to the specific information extracted in a map, includes: inquiring the point of interest related to a site, if there is information about the site in the specific information extracted.

Preferably, the method further includes: selecting a point of interest related to an event from the points of interest inquired, if there is also information about the event in the specific information extracted.

Preferably, selecting a point of interest related to an event from the points of interest inquired, includes: determining an action related to the event; extracting a word with a better comment related to the action determined from comment information of the point of interest inquired; calculating a contact strength between the word extracted and the event; using the word extracted as a key word to select the point of interest related to the event from the points of interest inquired, if the contact strength calculated is in accordance with a predetermined condition.

Preferably, calculating a contact strength between the word extracted and the event, specifically includes:

if the word extracted is from a same comment content of a same point of interest, calculating the contact strength between the word extracted and the event by a following formula:

$$R_c = \frac{1}{(1 + \exp(1))\text{Num}}$$

and/or if the word extracted is from different comment contents of a same point of interest, calculating the contact strength between the word extracted and the event by a following formula:

$$R_c = \frac{0.5}{\text{Num}}$$

and/or if the word extracted is from comment contents of different points of interest, calculating the contact strength between the word extracted and the event by a following formula:

$$R_c = \frac{1}{(1 + \exp(-1))\text{Num}}$$

where $R_c$ represents the contact strength between the word extracted and the event; Num represents the number of the words extracted.

According to another aspect of the present disclosure, an apparatus for inquiring a map is provided. The apparatus includes: a receiving unit, configured to receive a query statement inputted by a user; a word-segmenting unit, configured to perform a word segmentation on the query statement received to obtain a result of the word segmentation; an extracting unit, configured to extract specific information related to a demand of the user from the result of the word segmentation; an inquiring unit, configured to inquiry a route and/or a point of interest related to the specific information extracted in a map.

Preferably, the inquiring unit includes: a terminal point determining sub-unit, configured to determine a site as a terminal point of a route planning, if there is information about the site in the specific information extracted; an origin determining sub-unit, configured to position a geographical position where the user is located to obtain a positioning result, and to determine the positioning result as an origin of the route planning; a route inquiring sub-unit, configured to inquiry the route related to the specific information extracted in the map according to the origin and the terminal point determined.

Preferably, the apparatus further includes: a road condition acquiring unit, configured to acquire road condition information of the route inquired at a time, if there is also information about the time in the specific information extracted.

Preferably, the apparatus further includes: a travel time calculating unit, configured to calculate a travel time of the user in accordance with the route inquired, according to the route inquired and the road condition information acquired.

Preferably, if a self-driving is employed, the travel time calculating unit is configured to calculate the travel time of the user in accordance with the route inquired by a following formula:

$$T_v = \sum_{i=1}^{n} S_i \frac{(1 + \exp(-X_i))V_v}{\text{Rate}_v}$$

where $T_v$ represents a travel time of the user in accordance with a self-driving route inquired;

$S_i$ represents a travel distance of an $i^{th}$ road section on the self-driving route inquired;

$X_i$ represents a road condition congestion value of the $i^{th}$ road section on the self-driving route inquired;

$V_v$ represents a predetermined speed of a self-driving vehicle;

$\text{Rate}_v$ represents a congestion influence rate of the self-driving on the travel time;

and/or if a public transport is employed, the travel time calculating unit is configured to calculate the travel time of the user in accordance with the route inquired by a following formula:

$$T_p = \sum_{i=1}^{n} S_i \frac{(1 + \exp(-X_i))V_p}{\text{Rate}_p}$$

where $T_p$ represents a travel time of the user in accordance with a public transport route inquired;

$S_i$ represents a travel distance of an $i^{th}$ road section on the public transport route inquired;

$X_i$ represents a road condition congestion value of the $i^{th}$ road section on the public transport route inquired;

$V_p$ represents a predetermined speed of public transport;

$\text{Rate}_p$ represents a congestion influence rate of the public transport on the travel time;

and/or if a walking is employed, the travel time calculating unit is configured to calculate the travel time of the user in accordance with the route inquired by a following formula:

$$T_w = \frac{S}{V_w}$$

where $T_w$ represents a travel time of the user in accordance with a walking route inquired; S represents a travel distance of the walking route inquired; $V_w$ represents a predetermined speed of walking.

Preferably, the inquiring unit is configured to inquire the point of interest related to a site, if there is information about the site in the specific information extracted.

Preferably, the apparatus further includes: an event selecting unit, configured to select a point of interest related to an event from the points of interest inquired, if there is also information about the event in the specific information extracted.

Preferably, the event selecting unit includes: a related action determining sub-unit, configured to determine an action related to the event; a comment information extracting sub-unit, configured to extract a word with a better comment related to the action determined from comment information of the point of interest inquired; a contact strength calculating sub-unit, configured to calculate a contact strength between the word extracted and the event; a point of interest selecting sub-unit, configured to use the word extracted as a key word to select the point of interest related to the event from the points of interest inquired, if the contact strength calculated is in accordance with a predetermined condition.

Preferably, if the word extracted is from a same comment content of a same point of interest, the contact strength calculating sub-unit is configured to calculate the contact strength between the word extracted and the event by a following formula:

$$R_c = \frac{1}{(1 + \exp(1))\text{Num}}$$

and/or
if the word extracted is from different comment contents of a same point of interest, the contact strength calculating sub-unit is configured to calculate the contact strength between the word extracted and the event by a following formula:

$$R_c = \frac{0.5}{\text{Num}}$$

and/or
if the word extracted is from comment contents of different points of interest, the contact strength calculating sub-unit is configured to calculate the contact strength between the word extracted and the event by a following formula:

$$R_c = \frac{1}{(1 + \exp(-1))\text{Num}}$$

where $R_c$ represents the contact strength between the word extracted and the event; Num represents the number of the words extracted.

Compared with the related art, the present disclosure may not only perform the map inquiry according to the user's demand contained in the query statement, but also enable the result of the map inquiry to be closer to the user's demand.

Meanwhile, this also enables the map inquiry to be more intelligent, thus improving a user's experience.

DETAILED DESCRIPTION

In order to make the purpose, technical solution and advantages of the present disclosure more clear, the present disclosure will be described in detail with reference to drawings and specific embodiments.

Figure 1:
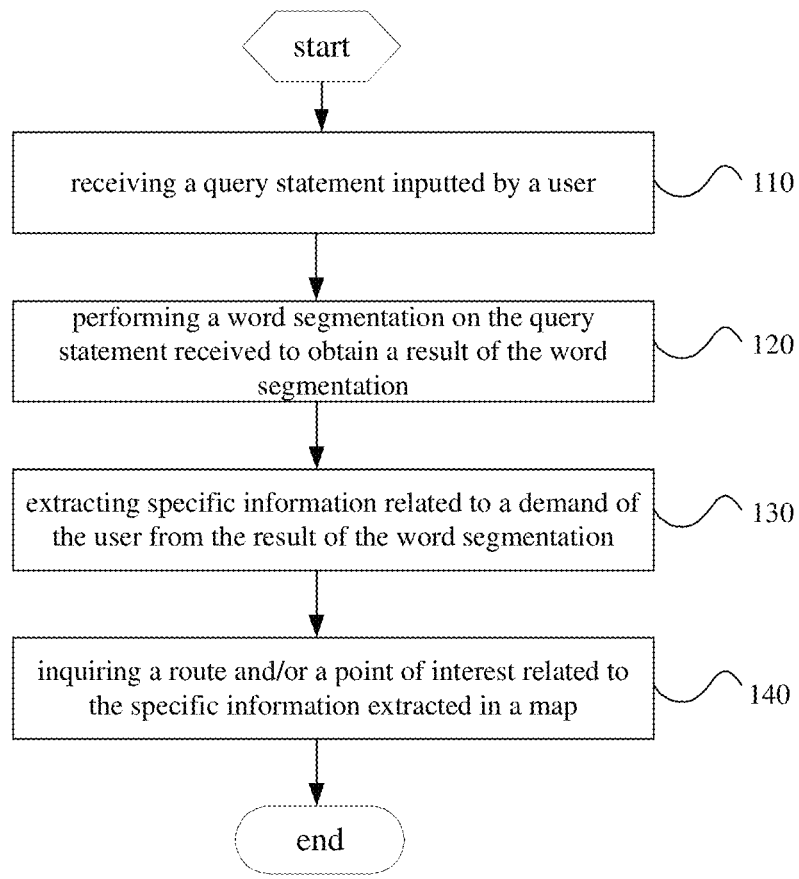
FIG. 1 is a flow chart of a method for inquiring a map according to an exemplary embodiment of the present disclosure.

FIG. 1 is a flow chart of a method for inquiring a map according to a preferred embodiment of the present disclosure. An apparatus for inquiring a map shown in FIG. 2 may be used to realize the method illustrated in FIG. 1.

Referring to FIG. 1, in step 110, the apparatus receives a query statement inputted by a user.

In step 120, the apparatus performs a word segmentation on the query statement received to obtain a result of the word segmentation.

In step 130, the apparatus extracts specific information related to a demand of the user from the result of the word segmentation.

In step 140, the apparatus inquires a route and/or a point of interest related to the specific information extracted in a map.

The specific information related to the demand of the user may be any one of following information: time, location, figure, event, or may be other information, which is not constructed to be limited in the present disclosure, as long as the specific information extracted can fully reflect the demand of the user.

According to an exemplary embodiment of the present disclosure for inquiring a route, inquiring the route related to the specific information extracted in the map by the apparatus includes following specific steps: determining a site as a terminal point of a route planning, if there is information about the site in the specific information extracted; positioning a geographical position where the user is located to obtain a positioning result, and determining the positioning result as an origin of the route planning; inquiring the route related to the specific information extracted in the map according to the origin and the terminal point determined.

In order to make the user know road condition information of the route inquired on time while the user inquires the route, according to another exemplary embodiment of the present disclosure for inquiring the route, based on the embodiment shown in FIG. 1, the method further includes: acquiring road condition information of the route inquired at a time by the apparatus, if there is also information about the time in the specific information extracted. During an implementation, the road condition information will return traffic congestion information of each road section in the route inquired, for instance, in following road condition information:

[c1, c2]: 0.8, [c2, c3]: 0.5, [c3, c4]: −0.9, . . . .

where c1 represents an origin of a road section [c1, c2], c2 represents a terminal point of a road section [c1, c2] and so forth. The value is in a range from −1 to 1, where 1 represents clearness, and −1 represents a congestion.

In order to provide the user with a preferred travel route and improve an inquiry experience for the user, according to another exemplary embodiment of the present disclosure for inquiring the route, based on the embodiment shown in FIG. 1, the method further includes: calculating a travel time of the user in accordance with the route inquired by the apparatus, according to the route inquired and the road condition information acquired.

Specifically, according to an exemplary embodiment of the present disclosure for calculating the travel time, calculating a travel time of the user in accordance with the route inquired by the apparatus includes following specific steps: if a self-driving is employed, calculating the travel time of the user in accordance with the route inquired by a following formula:

$$T_v = \sum_{i=1}^{n} S_i \frac{(1 + \exp(-X_i))V_v}{\text{Rate}_v}$$

where $T_v$ represents a travel time of the user in accordance with a self-driving route inquired; $S_i$ represents a travel distance of an $i^{th}$ road section on the self-driving route inquired; $X_i$ represents a road condition congestion value of the $i^{th}$ road section on the self-driving route inquired; $V_v$ represents a predetermined speed of a self-driving vehicle (e.g. a predetermined speed of 60 km/h); $\text{Rate}_v$ represents a congestion influence rate of the self-driving on the travel time.

Specifically, according to another exemplary embodiment of the present disclosure for calculating the travel time, calculating a travel time of the user in accordance with the route inquired by the apparatus includes following specific steps: if a public transport is employed, calculating the travel time of the user in accordance with the route inquired by a following formula:

$$T_p = \sum_{i=1}^{n} S_i \frac{(1 + \exp(-X_i))V_p}{\text{Rate}_p}$$

where $T_p$ represents a travel time of the user in accordance with a public transport route inquired; $S_i$ represents a travel distance of an $i^{th}$ road section on the public transport route inquired; $X_i$ represents a road condition congestion value of the $i^{th}$ road section on the public transport route inquired; $V_p$ represents a predetermined speed of public transport (e.g. a speed of a subway may be predetermined as 80 km/h); $\text{Rate}_p$ represents a congestion influence rate of the public transport on the travel time.

Specifically, according to another exemplary embodiment of the present disclosure for calculating the travel time, calculating a travel time of the user in accordance with the route inquired by the apparatus includes following specific steps: if a walking is employed, calculating the travel time of the user in accordance with the route inquired by a following formula:

$$T_w = \frac{S}{V_w}$$

where $T_w$ represents a travel time of the user in accordance with a walking route inquired; $S$ represents a travel distance of the walking route inquired; $V_w$ represents a predetermined speed of walking (e.g. a predetermined speed of 5 km/h).

It should be illustrated that, the apparatus may implement separately any one of the three exemplary embodiments for calculating the travel time, or may implement a combination of the three exemplary embodiments for calculating the travel time. For instance, the apparatus may also recommend a route with the shortest travel time to the user by comparison.

According to an exemplary embodiment of the present disclosure for inquiring the point of interest, inquiring a point of interest related to the specific information extracted in a map by the apparatus, includes following specific step: inquiring the point of interest related to a site by the apparatus, if there is information about the site in the specific information extracted. For instance, if location information extracted is "Shangdi Hualian", the points of interest related to the location include "Hallasan Shangdi Hualian Branch", "Xinladao Hualian Branch", "Xiabuxiabu Hualian Branch", "Jiahe Studio", etc.

In order to enable the points of interest inquired to be closer to the demand of the user, according to another exemplary embodiment of the present disclosure for inquiring the point of interest, based on the embodiment shown in FIG. 1, the method further includes: selecting a point of interest related to an event from the points of interest inquired, if there is also information about the event in the specific information extracted.

Specifically, according to another exemplary embodiment of the present disclosure for selecting the point of interest, selecting a point of interest related to an event from the points of interest inquired, includes following specific steps: determining an action related to the event by the apparatus; extracting a word with a better comment related to the action determined from comment information of the point of interest inquired; calculating a contact strength between the word extracted and the event (i.e., an emotional tendency of the user); using the word extracted as a key word to select the point of interest related to the event from the points of interest inquired, if the contact strength calculated is in accordance with a predetermined condition. For instance, if the information about the event extracted is "date", the action information related to the information about the event refers to "eat", "drink coffee", "watch movie", "buy flowers", etc.

It should be understood that, the process above for selecting the point of interest is only illustrative, which is not construed to limit the present disclosure. As long as it enables the point of interest selected to be closer to the demand of the user, the process for selecting the point of interest may be applied in the present disclosure.

More specifically, according to an exemplary embodiment of the present disclosure for calculating the contact strength, calculating the contact strength between the word extracted and the event by the apparatus, includes following specific steps: if the word extracted is from a same comment content of a same point of interest, calculating the contact strength between the word extracted and the event by a following formula:

$$R_c = \frac{1}{(1 + \exp(1))\text{Num}}$$

where $R_c$ represents the contact strength between the word extracted and the event; Num represents the number of the words extracted.

More specifically, according to another exemplary embodiment of the present disclosure for calculating the contact strength, calculating the contact strength between the word extracted and the event by the apparatus, includes following specific steps: if the word extracted is from different comment contents of a same point of interest, calculating the contact strength between the word extracted and the event by a following formula:

$$R_c = \frac{0.5}{\text{Num}}$$

where $R_c$ represents the contact strength between the word extracted and the event; Num represents the number of the words extracted.

More specifically, according to another exemplary embodiment of the present disclosure for calculating the contact strength, calculating the contact strength between the word extracted and the event by the apparatus, includes following specific steps: if the word extracted is from comment contents of different points of interest, calculating the contact strength between the word extracted and the event by a following formula:

$$R_c = \frac{1}{(1 + \exp(-1))\text{Num}}$$

where $R_c$ represents the contact strength between the word extracted and the event; Num represents the number of the words extracted.

For instance, if different comment contents of a same point of interest include "the environment of this restaurant is romantic" and "good environment for date", positive comment contents extracted by the apparatus are words with a subordinate or a peer relationship, such as "romantic", "date", "good". According to the method described above, the contact strength of these words extracted calculated by the apparatus is 0.15, and then (romantic, good, date):0.15 is used as one group of Key value for being added to a zipper (a type of search data) structure, the zippers with top ranked contact strength values (such as, top five) are used as inquiry bases to select the point of interest closer to the demand of the user.

It should be illustrated that, the apparatus may implement separately any one of the three exemplary embodiments for calculating the contact strength, or may implement a combination of the three exemplary embodiments for calculating the contact strength, which are not construed to limit the present disclosure.

Figure 2:
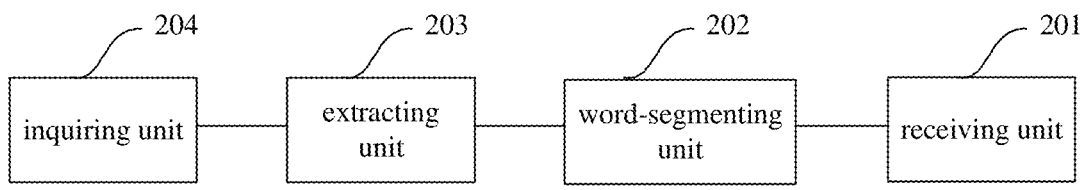
FIG. 2 is a block diagram of an apparatus for inquiring a map according to an exemplary embodiment of the present disclosure.

Referring to FIG. 2, the apparatus includes at least a receiving unit 201, a word-segmenting unit 202, an extracting unit 203 and an inquiring unit 204.

The receiving unit 201 is configured to receive a query statement inputted by a user.

The word-segmenting unit 202 is configured to perform a word segmentation on the query statement received to obtain a result of the word segmentation.

The extracting unit 203 is configured to extract specific information related to a demand of the user from the result of the word segmentation.

The inquiring unit 204 is configured to inquiry a route and/or a point of interest related to the specific information extracted in a map.

The specific information related to the demand of the user may be any one of following information: time, location, figure, event, or may be other information, which is not constructed to be limited in the present disclosure, as long as the specific information extracted can fully reflect the demand of the user.

According to an exemplary embodiment of the present disclosure for inquiring a route, the inquiring unit 204 includes: a terminal point determining sub-unit (not shown in the figure), configured to determine a site as a terminal point of a route planning, if there is information about the site in the specific information extracted; an origin determining sub-unit (not shown in the figure), configured to position a geographical position where the user is located to obtain a positioning result, and to determine the positioning result as an origin of the route planning; a route inquiring sub-unit (not shown in the figure), configured to inquiry the route related to the specific information extracted in the map according to the origin and the terminal point determined.

In order to make the user know road condition information of the route inquired on time while the user inquires the route, according to another exemplary embodiment of the present disclosure for inquiring the route, based on the embodiment shown in FIG. 2, the apparatus further includes: a road condition acquiring unit, configured to acquire road condition information of the route inquired at a time, if there is also information about the time in the specific information extracted.

In order to provide the user with a preferred travel route and improve an inquiry experience for the user, according to another exemplary embodiment of the present disclosure for inquiring the route, based on the embodiment shown in FIG. 2, the apparatus further includes: a travel time calculating unit, configured to calculate a travel time of the user in accordance with the route inquired, according to the route inquired and the road condition information acquired.

Specifically, according to an exemplary embodiment of the present disclosure for calculating the travel time, if a self-driving is employed, the travel time calculating unit is configured to calculate the travel time of the user in accordance with the route inquired by a following formula:

$$T_v = \sum_{i=1}^{n} S_i \frac{(1 + \exp(-X_i))V_v}{\text{Rate}_v}$$

where $T_v$ represents a travel time of the user in accordance with a self-driving route inquired; $S_i$ represents a travel distance of an $i^{th}$ road section on the self-driving route inquired; $X_i$ represents a road condition congestion value of the $i^{th}$ road section on the self-driving route inquired; $V_v$ represents a predetermined speed of a self-driving vehicle; $\text{Rate}_v$ represents a congestion influence rate of the self-driving on the travel time.

Specifically, according to another exemplary embodiment of the present disclosure for calculating the travel time, if a public transport is employed, the travel time calculating unit is configured to calculate the travel time of the user in accordance with the route inquired by a following formula:

$$T_p = \sum_{i=1}^{n} S_i \frac{(1 + \exp(-X_i))V_p}{\text{Rate}_p}$$

where $T_p$ represents a travel time of the user in accordance with a public transport route inquired; $S_i$ represents a travel distance of an $i^{th}$ road section on the public transport route inquired; $X_i$ represents a road condition congestion value of the $i^{th}$ road section on the public transport route inquired; $V_p$ represents a predetermined speed of public transport; $Rate_p$ represents a congestion influence rate of the public transport on the travel time.

Specifically, according to another exemplary embodiment of the present disclosure for calculating the travel time, if a walking is employed, the travel time calculating unit is configured to calculate the travel time of the user in accordance with the route inquired by a following formula:

$$T_w = \frac{S}{V_w}$$

where $T_w$ represents a travel time of the user in accordance with a walking route inquired; S represents a travel distance of the walking route inquired; $V_w$ represents a predetermined speed of walking.

It should be illustrated that, the apparatus may implement separately any one of the three exemplary embodiments for calculating the travel time, or may implement a combination of the three exemplary embodiments for calculating the travel time, which are not construed to limit the present disclosure.

According to an exemplary embodiment of the present disclosure for inquiring the point of interest, the inquiring unit is configured to inquire the point of interest related to a site, if there is information about the site in the specific information extracted.

According to another exemplary embodiment of the present disclosure for inquiring the point of interest, based on the embodiment shown in FIG. 2, the apparatus further includes: an event selecting unit (not shown in the figure), configured to select a point of interest related to an event from the points of interest inquired, if there is also information about the event in the specific information extracted.

Specifically, according to an exemplary embodiment of the present disclosure for selecting the point of interest, the event selecting unit includes: a related action determining sub-unit, configured to determine an action related to the event; a comment information extracting sub-unit, configured to extract a word with a better comment related to the action determined from comment information of the point of interest inquired; a contact strength calculating sub-unit, configured to calculate a contact strength between the word extracted and the event; a point of interest selecting sub-unit, configured to use the word extracted as a key word to select the point of interest related to the event from the points of interest inquired, if the contact strength calculated is in accordance with a predetermined condition.

It should be understood that, the process above for selecting the point of interest is only illustrative, which is not construed to limit the present disclosure. As long as it enables the point of interest selected to be closer to the demand of the user, the process for selecting the point of interest may be applied in the present disclosure.

More specifically, according to an exemplary embodiment of the present disclosure for calculating the contact strength, if the word extracted is from a same comment content of a same point of interest, the contact strength calculating sub-unit is configured to calculate the contact strength between the word extracted and the event by a following formula:

$$R_c = \frac{1}{(1+\exp(1))\text{Num}}$$

More specifically, according to another exemplary embodiment of the present disclosure for calculating the contact strength, if the word extracted is from different comment contents of a same point of interest, the contact strength calculating sub-unit is configured to calculate the contact strength between the word extracted and the event by a following formula:

$$R_c = \frac{0.5}{\text{Num}}$$

More specifically, according to another exemplary embodiment of the present disclosure for calculating the contact strength, if the word extracted is from comment contents of different points of interest, the contact strength calculating sub-unit is configured to calculate the contact strength between the word extracted and the event by a following formula:

$$R_c = \frac{1}{(1+\exp(-1))\text{Num}}$$

where $R_c$ represents the contact strength between the word extracted and the event; Num represents the number of the words extracted.

It should be illustrated that, the apparatus may implement separately any one of the three exemplary embodiments for calculating the contact strength, or may implement a combination of the three exemplary embodiments for calculating the contact strength, which are not construed to limit the present disclosure.

The present disclosure may not only perform the map inquiry according to the user's demand contained in the query statement, but also enable the result of the map inquiry to be closer to the user's demand. Meanwhile, this also enables the map inquiry to be more intelligent, thus improving a user's experience.

It should be noted that, based on requirements of an implementation, each step described in the present disclosure may be divided into more steps, or two or more steps or partial operations of steps may be combined into a new step, so as to achieve the purpose of the present disclosure.

The method above according to the present disclosure may be realized in hardware, firmware, or may be realized as software or computer codes which are stored in a recording medium (such as a CD ROM, an RAM, a soft disk, a magnetic disc, an optical disc), or may be realized as computer codes which are downloaded via a network and originally stored in a remote recording medium or in a non-transitory machine-readable medium and will be stored in a local recording medium. Therefore, the method described herein may be processed by such software which is stored in a recording medium used in a general computer, a dedicated processor or programmable or dedicated hardware (such as ASIC or FPGA). It is understood that, a computer, a processor, a micro-processing controller or programmable hardware includes a storage assembly (such as, RAM, ROM, a flash memory, etc.) which may store or receive software or computer codes, and when accessed or executed by a computer, a processor or hardware, the software or computer codes realize the processing method described herein. In addition, when a general computer accesses the processing codes shown herein, an execution of the codes converts the general computer into a dedicated computer for executing the processing shown herein.

Although preferred embodiments have been shown and described above, it would be appreciated that the above embodiments cannot be construed to limit the present disclosure, and any change, alternative, and modification made without departing from spirit and principles of the present disclosure should be included in the scope of the present disclosure.

What is claimed is:

1. A method for inquiring a map, comprising:
receiving a query statement inputted by a user;
performing a word segmentation on the query statement received to obtain a result of the word segmentation;
extracting specific information related to a demand of the user from the result of the word segmentation;
inquiring a route and/or a point of interest related to the specific information extracted in a map;
acquiring road condition information of the route inquired at a time, if there is also information about the time in the specific information extracted;
calculating a travel time of the user in accordance with the route inquired, according to the route inquired and the road condition information acquired;
wherein inquiring a route related to the specific information extracted in a map, comprises:
   determining a site as a terminal point of a route planning, if there is information about the site in the specific information extracted;
   positioning a geographical position where the user is located to obtain a positioning result, and determining the positioning result as an origin of the route planning;
   inquiring the route related to the specific information extracted in the map according to the origin and the terminal point determined;
wherein calculating a travel time of the user in accordance with the route inquired, comprises:
   if a self-driving is employed, calculating the travel time of the user in accordance with the route inquired by a following formula:

$$T_v = \sum_{i=1}^{n} S_i \frac{(1 + \exp(-X_i))V_v}{\text{Rate}_v}$$

where $T_v$ represents a travel time of the user in accordance with a self-driving route inquired;
$S_i$ represents a travel distance of an $i^{th}$ road section on the self-driving route inquired;
$X_i$ represents a road condition congestion value of the $i^{th}$ road section on the self-driving route inquired;
$V_v$ represents a predetermined speed of a self-driving vehicle;
$\text{Rate}_v$ represents a congestion influence rate of the self-driving on the travel time;
and/or if a public transport is employed, calculating the travel time of the user in accordance with the route inquired by a following formula:

$$T_p = \sum_{i=1}^{n} S_i \frac{(1 + \exp(-X_i))V_p}{\text{Rate}_p}$$

where $T_p$ represents a travel time of the user in accordance with a public transport route inquired;
$S_i$ represents a travel distance of an $i^{th}$ road section on the public transport route inquired;
$X_i$ represents a road condition congestion value of the $i^{th}$ road section on the public transport route inquired;
$V_p$ represents a predetermined speed of public transport;
$\text{Rate}_v$ represents a congestion influence rate of the public transport on the travel time;
and/or if a walking is employed, calculating the travel time of the user in accordance with the route inquired by a following formula:

$$T_w = \frac{S}{V_w}$$

where $T_w$ represents a travel time of the user in accordance with a walking route inquired;
S represents a travel distance of the walking route inquired;
$V_w$ represents a predetermined speed of walking.

2. The method of claim 1, wherein inquiring a point of interest related to the specific information extracted in a map, comprises:
inquiring the point of interest related to a site, if there is information about the site in the specific information extracted.

3. The method of claim 2, further comprising:
selecting a point of interest related to an event from the points of interest inquired, if there is also information about the event in the specific information extracted.

4. The method of claim 3, wherein selecting a point of interest related to an event from the points of interest inquired, comprises:
determining an action related to the event;
extracting a word with a better comment related to the action determined from comment information of the point of interest inquired;
calculating a contact strength between the word extracted and the event;
using the word extracted as a key word to select the point of interest related to the event from the points of interest inquired, if the contact strength calculated is in accordance with a predetermined condition.

5. The method of claim 4, wherein calculating a contact strength between the word extracted and the event, comprises:
if the word extracted is from a same comment content of a same point of interest, calculating the contact strength between the word extracted and the event by a following formula:

$$R_c = \frac{1}{(1 + \exp(1))\text{Num}}$$

and/or if the word extracted is from different comment contents of a same point of interest, calculating the contact strength between the word extracted and the event by a following formula:

$$R_c = \frac{0.5}{\text{Num}}$$

and/or if the word extracted is from comment contents of different points of interest, calculating the contact strength between the word extracted and the event by a following formula:

$$R_c = \frac{1}{(1 + \exp(-1))\text{Num}}$$

where $R_c$ represents the contact strength between the word extracted and the event;

Num represents the number of the words extracted.

6. An apparatus for inquiring a map, comprising:

a receiving unit, configured to receive a query statement inputted by a user;

a word-segmenting unit, configured to perform a word segmentation on the query statement received to obtain a result of the word segmentation;

an extracting unit, configured to extract specific information related to a demand of the user from the result of the word segmentation;

an inquiring unit, configured to inquiry a route and/or a point of interest related to the specific information extracted in a map;

a road condition acquiring unit, configured to acquire road condition information of the route inquired at a time, if there is also information about the time in the specific information extracted;

a travel time calculating unit, configured to calculate a travel time of the user in accordance with the route inquired, according to the route inquired and the road condition information acquired;

wherein the inquiring unit comprises:
 a terminal point determining sub-unit, configured to determine a site as a terminal point of a route planning, if there is information about the site in the specific information extracted;
 an origin determining sub-unit, configured to position a geographical position where the user is located to obtain a positioning result, and to determine the positioning result as an origin of the route planning;
 a route inquiring sub-unit, configured to inquiry the route related to the specific information extracted in the map according to the origin and the terminal point determined;

wherein if a self-driving is employed, the travel time calculating unit is configured to calculate the travel time of the user in accordance with the route inquired by a following formula:

$$T_v = \sum_{i=1}^{n} S_i \frac{(1 + \exp(-X_i))V_v}{\text{Rate}_v}$$

where $T_v$ represents a travel time of the user in accordance with a self-driving route inquired;

$S_i$ represents a travel distance of an $i^{th}$ road section on the self-driving route inquired;

$X_i$ represents a road condition congestion value of the $i^{th}$ road section on the self-driving route inquired;

$V_v$ represents a predetermined speed of a self-driving vehicle;

$\text{Rate}_v$ represents a congestion influence rate of the self-driving on the travel time;

and/or if a public transport is employed, the travel time calculating unit is configured to calculate the travel time of the user in accordance with the route inquired by a following formula:

$$T_p = \sum_{i=1}^{n} S_i \frac{(1 + \exp(-X_i))V_p}{\text{Rate}_p}$$

where $T_p$ represents a travel time of the user in accordance with a public transport route inquired;

$S_i$ represents a travel distance of an $i^{th}$ road section on the public transport route inquired;

$X_i$ represents a road condition congestion value of the $i^{th}$ road section on the public transport route inquired;

$V_p$ represents a predetermined speed of public transport;

$\text{Rate}_v$ represents a congestion influence rate of the public transport on the travel time;

and/or if a walking is employed, the travel time calculating unit is configured to calculate the travel time of the user in accordance with the route inquired by a following formula:

$$T_w = \frac{S}{V_w}$$

where $T_w$ represents a travel time of the user in accordance with a walking route inquired;

S represents a travel distance of the walking route inquired;

$V_w$ represents a predetermined speed of walking.

7. The apparatus of claim 6, wherein the inquiring unit is configured to inquire the point of interest related to a site, if there is information about the site in the specific information extracted.

8. The apparatus of claim 7, further comprising:

an event selecting unit, configured to select a point of interest related to an event from the points of interest inquired, if there is also information about the event in the specific information extracted.

9. The apparatus of claim 8, wherein the event selecting unit comprises:

a related action determining sub-unit, configured to determine an action related to the event;

a comment information extracting sub-unit, configured to extract a word with a better comment related to the action determined from comment information of the point of interest inquired;

a contact strength calculating sub-unit, configured to calculate a contact strength between the word extracted and the event;

a point of interest selecting sub-unit, configured to use the word extracted as a key word to select the point of interest related to the event from the points of interest inquired, if the contact strength calculated is in accordance with a predetermined condition.

10. The apparatus of claim 9, wherein
if the word extracted is from a same comment content of a same point of interest, the contact strength calculating sub-unit is configured to calculate the contact strength between the word extracted and the event by a following formula:

$$R_c = \frac{1}{(1+\exp(1))\text{Num}}$$

and/or
if the word extracted is from different comment contents of a same point of interest, the contact strength calculating sub-unit is configured to calculate the contact strength between the word extracted and the event by a following formula:

$$R_c = \frac{0.5}{\text{Num}}$$

and/or
if the word extracted is from comment contents of different points of interest, the contact strength calculating sub-unit is configured to calculate the contact strength between the word extracted and the event by a following formula:

$$R_c = \frac{1}{(1+\exp(-1))\text{Num}}$$

where $R_c$ represents the contact strength between the word extracted and the event;
Num represents the number of the words extracted.

11. A device, comprising:
one or more processors;
a memory;
one or more programs stored in the memory, when executed by the one or more processors, performing following operations:
receiving a query statement inputted by a user;
performing a word segmentation on the query statement received to obtain a result of the word segmentation;
extracting specific information related to a demand of the user from the result of the word segmentation;
inquiring a route and/or a point of interest related to the specific information extracted in a map;
wherein inquiring a route related to the specific information extracted in a map, comprises:
determining a site as a terminal point of a route planning, if there is information about the site in the specific information extracted;
positioning a geographical position where the user is located to obtain a positioning result, and determining the positioning result as an origin of the route planning;
inquiring the route related to the specific information extracted in the map according to the origin and the terminal point determined,
and performing following operations:
acquiring road condition information of the route inquired at a time, if there is also information about the time in the specific information extracted;
calculating a travel time of the user in accordance with the route inquired, according to the route inquired and the road condition information acquired,
wherein calculating a travel time of the user in accordance with the route inquired, comprises:
if a self-driving is employed, calculating the travel time of the user in accordance with the route inquired by a following formula:

$$T_v = \sum_{i=1}^{n} S_i \frac{(1+\exp(-X_i))V_v}{\text{Rate}_v}$$

where $T_v$ represents a travel time of the user in accordance with a self-driving route inquired;
$S_i$ represents a travel distance of an $i^{th}$ road section on the self-driving route inquired;
$X_i$ represents a road condition congestion value of the $i^{th}$ road section on the self-driving route inquired;
$V_v$ represents a predetermined speed of a self-driving vehicle;
$\text{Rate}_v$ represents a congestion influence rate of the self-driving on the travel time;
and/or
if a public transport is employed, calculating the travel time of the user in accordance with the route inquired by a following formula:

$$T_p = \sum_{i=1}^{n} S_i \frac{(1+\exp(-X_i))V_p}{\text{Rate}_p}$$

where $T_p$ represents a travel time of the user in accordance with a public transport route inquired;
$S_i$ represents a travel distance of an $i^{th}$ road section on the public transport route inquired;
$X_i$ represents a road condition congestion value of the $i^{th}$ road section on the public transport route inquired;
$V_p$ represents a predetermined speed of public transport;
$\text{Rate}_v$ represents a congestion influence rate of the public transport on the travel time;
and/or
if a walking is employed, calculating the travel time of the user in accordance with the route inquired by a following formula:

$$T_w = \frac{S}{V_w}$$

where $T_w$ represents a travel time of the user in accordance with a walking route inquired;
S represents a travel distance of the walking route inquired;
$V_w$ represents a predetermined speed of walking.

* * * * *